United States Patent [19]
Ray

[11] Patent Number: 6,012,250
[45] Date of Patent: Jan. 11, 2000

[54] FLORAL DISPLAY HOLDER

[75] Inventor: James E. Ray, Brantford, Canada

[73] Assignee: Floral Ever Fresh Products Inc., Brantford, Canada

[21] Appl. No.: 08/921,230

[22] Filed: Aug. 29, 1997

[51] Int. Cl.⁷ .................................................. A01G 5/00
[52] U.S. Cl. ........................................ 47/41.01; 47/41.12
[58] Field of Search .............................. 47/41.01, 41.12, 47/41.11

[56] References Cited

U.S. PATENT DOCUMENTS

| | | |
|---|---|---|
| 3,127,698 | 4/1964 | Smithers . |
| 3,962,825 | 6/1976 | O'Connell . |
| 4,058,929 | 11/1977 | O'Connell . |
| 4,858,381 | 8/1989 | Walton ................................... 47/41.01 |
| 4,884,364 | 12/1989 | Ferris ..................................... 47/41.01 |
| 5,044,118 | 9/1991 | Ferris ..................................... 47/41.01 |
| 5,146,709 | 9/1992 | Iseki ....................................... 47/41.01 |
| 5,693,380 | 12/1997 | O'Connell .............................. 47/41.12 |

FOREIGN PATENT DOCUMENTS

| | | | |
|---|---|---|---|
| 2541075 | 8/1984 | France ................................... 47/41.01 |
| 6225829 | 8/1994 | Japan ..................................... 47/41.01 |
| 8902952 | 6/1991 | Netherlands .......................... 47/41.01 |
| 3099 | of 1898 | United Kingdom .................. 47/41.01 |

*Primary Examiner*—Michael J. Carone
*Assistant Examiner*—Joanne C. Downs
*Attorney, Agent, or Firm*—R. Craig Armstrong

[57] ABSTRACT

A floral display holder has a hollow body with a frontal recess for receiving a water-absorbing foam, and a manual pump to draw water from a lower portion defining a liquid reservoir. The floral display holder has U-shaped clips to secure the foam generally against a floor surface of the recess. The water drawn with the pump is directed onto the foam, thereby replenishing the foam with additional water.

5 Claims, 9 Drawing Sheets

FLORAL DISPLAY HOLDER

BACKGROUND OF THE INVENTION

1. Field of the Invention

This invention relates to floral display holders. In particular, the invention is directed toward floral display holders resting on an incline such as those attached to an easel or a tripod.

2. Description of the Prior Art

Many floral display holders today utilize a water-retaining foam (hereinafter referred to as the "floral foam" or "foam") to attach flowers thereon in a desired arrangement and at the same time provide water to the stems of the flowers to prevent wilting. Prior to piercing the floral foam with the desired flower arrangement, the floral foams are saturated with water. The foams are then placed onto a floral display holder and locked into place by retaining clips. The floral foam when fully saturated retains approximately five cups of water. Despite this initial saturation the floral foam gradually dries as a result of both evaporation into the ambient air and absorption by the flower arrangement.

In the case of an inclined floral display holder, such as the one shown in U.S. Pat. No. 4,058,929 to O'Connell, the inclination and the force of gravity cause a gradual migration of the water retained in the foam to migrate from the upper portions of the foam to the bottom. As the inclination from the horizontal increases, the migration becomes more exaggerated and the saturated foam gradually shifts downwards and begins to sag. As display time progresses the upper portion of the foam dries fairly quickly. As a consequence, the flowers inserted into the now dried-up portion may wilt earlier than those flowers inserted at the moister bottom portion of the foam. Currently, a user must, therefore, occasionally attend the floral display arrangement with a watering vessel inhand to re-saturate the floral foam. When water is simply added to the top portion of the floral foam, excess water begins to undesirably accumulate in the lower portion near the bottom of the foam. In the O'Connell patent, there is at least one aperture along the connecting edge of the upper bottom wall and the lowermost side wall to drain this excess water into the hollow interior of the product.

However, currently available inclining floral display holders fail to address the need to conveniently re-saturate a dried foam without a watering vessel. In addition there remains the problem of the upper portion of the floral foam disproportionately drying more quickly than the lower portion of the foam. In addition, there also remains the unfavourable condition of the foam shifting down and sagging. Moreover, a completed flower arrangement is difficult to handle, especially when fully loaded. A completed flower arrangement may weigh in the range of 40 to 50 pounds; therefore, a means to comfortably transport the holder is desired.

SUMMARY OF THE INVENTION

It is an object of the invention to overcome some of the drawbacks and disadvantages of currently available inclined floral display holders.

It is another object of the invention to minimize the need for a user to attend the inclined floral display holder with a flower watering vessel to re-saturate the floral foam.

It is another object of the invention to drain and re-circulate excess water accumulating at the bottom end of the inclined foam back to the upper portion of the foam.

It is another object of the invention to allow the user to easily transport by hand a completed flower arrangement.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
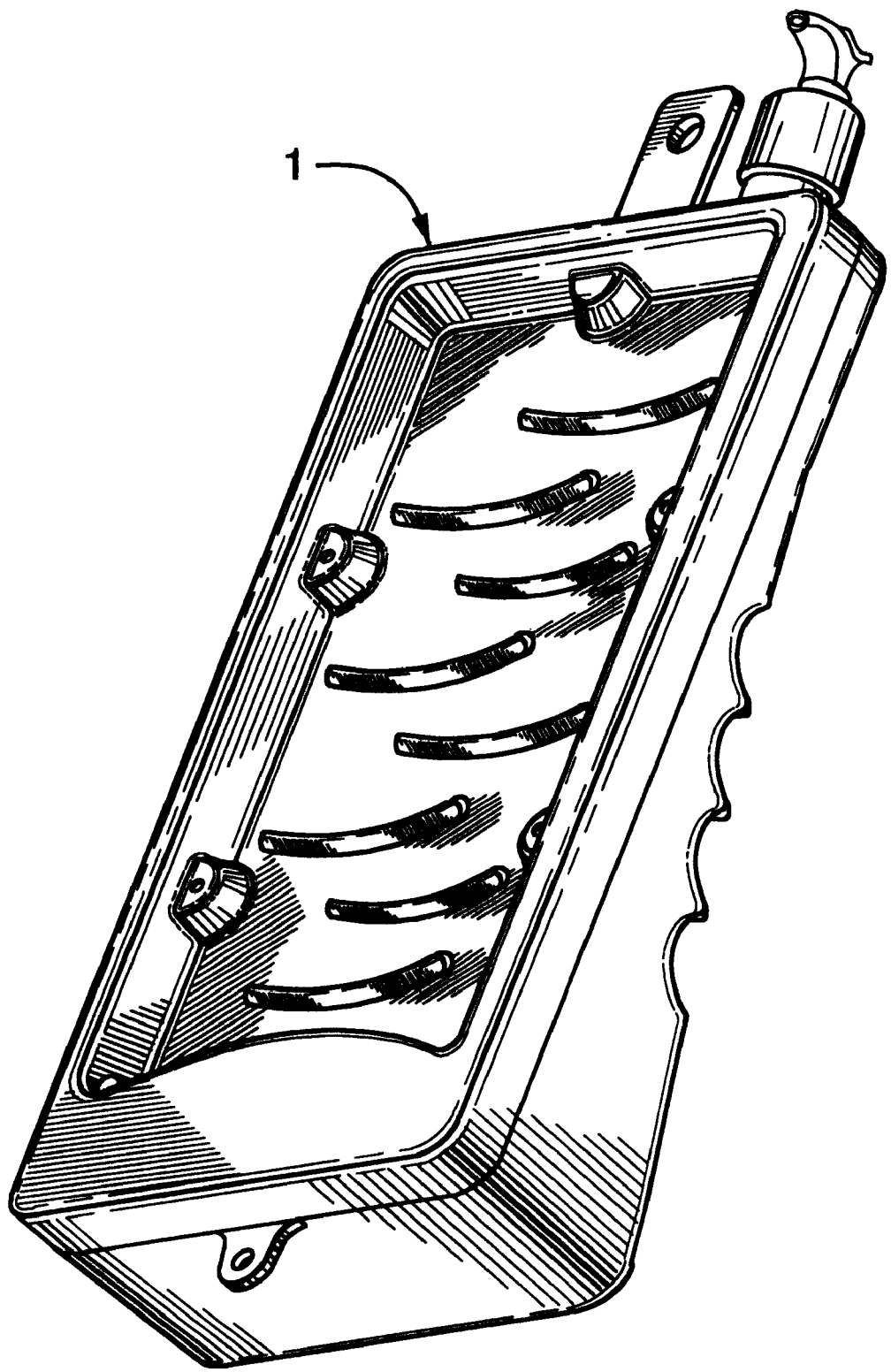
FIG. 1 is a perspective view of the display holder.
Figure 2:
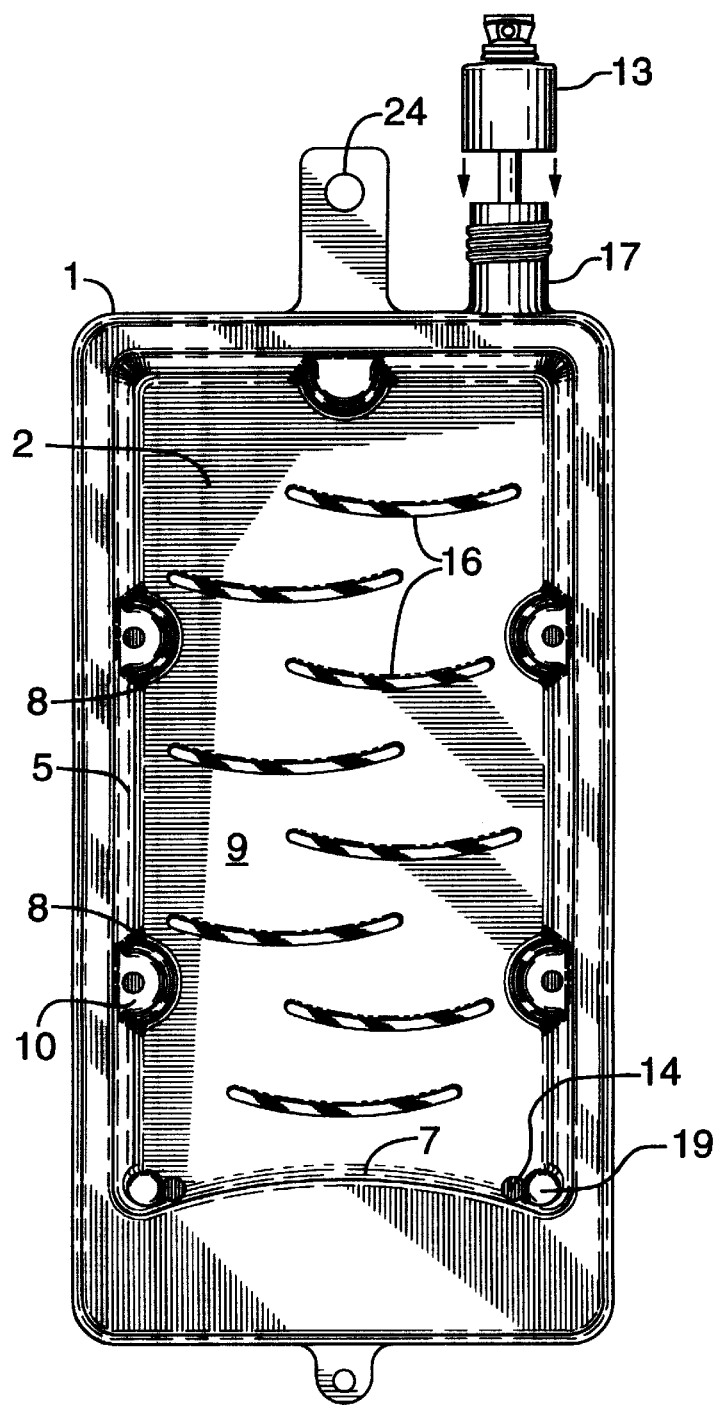
FIG. 2 is a front view of the display holder with the pump disengaged with the holder.
Figure 5:
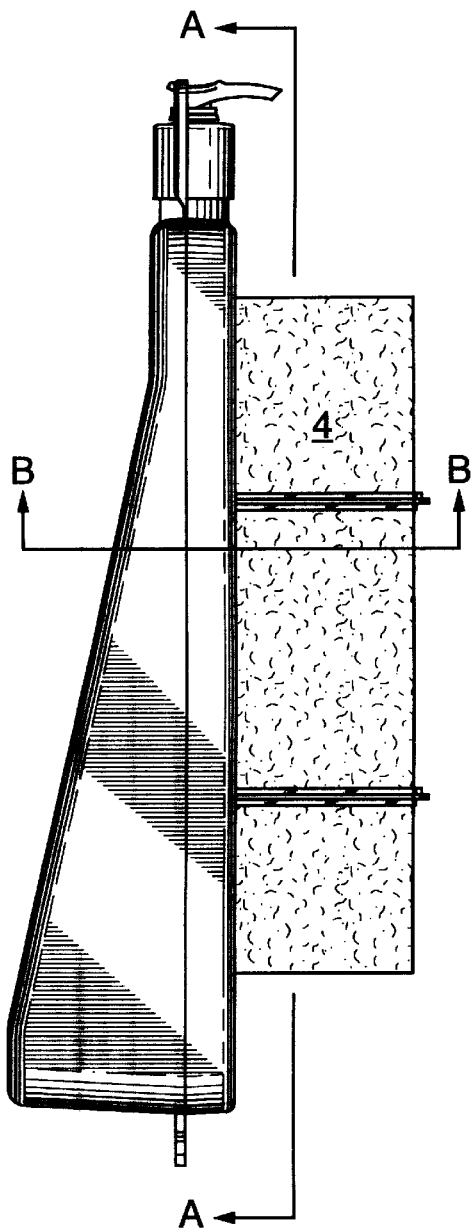
FIG. 5 is a side view of the display holder with the floral foam inserted and U-clips attached.

The accompanying drawings show the preferred embodiment of the floral display holder, formed as a hollow housing 1 (as shown in FIG. 1) by any suitable process such as blow molding. With reference to FIG. 2, the housing 1 has a foam receiving recess 2 on its front surface to allow the insertion of floral foam 4 (shown in FIG. 5).

Figure 4:
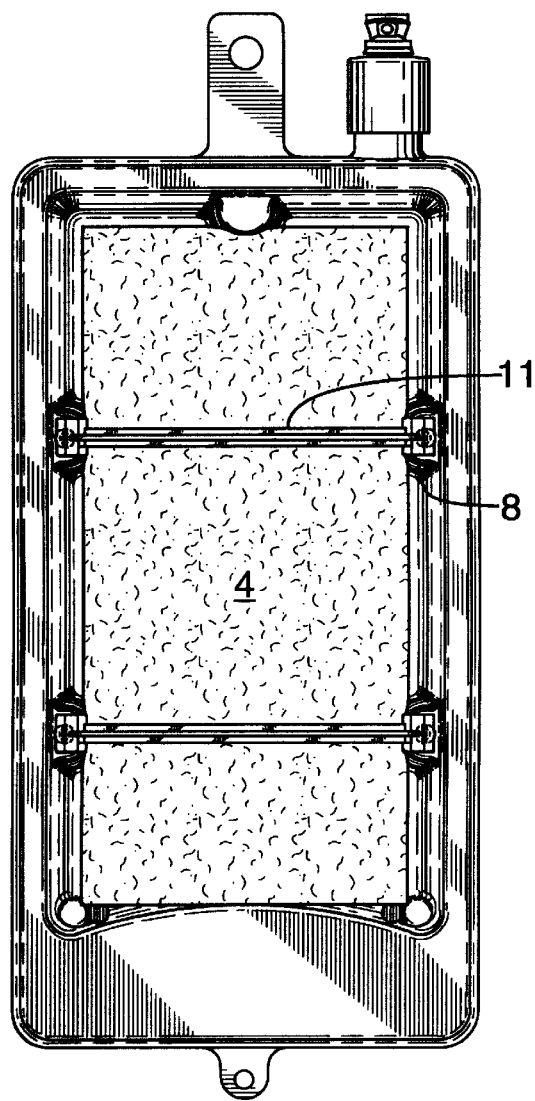
FIG. 4 is a front view of the display holder with the floral foam inserted and U-clips attached.
Figure 7:
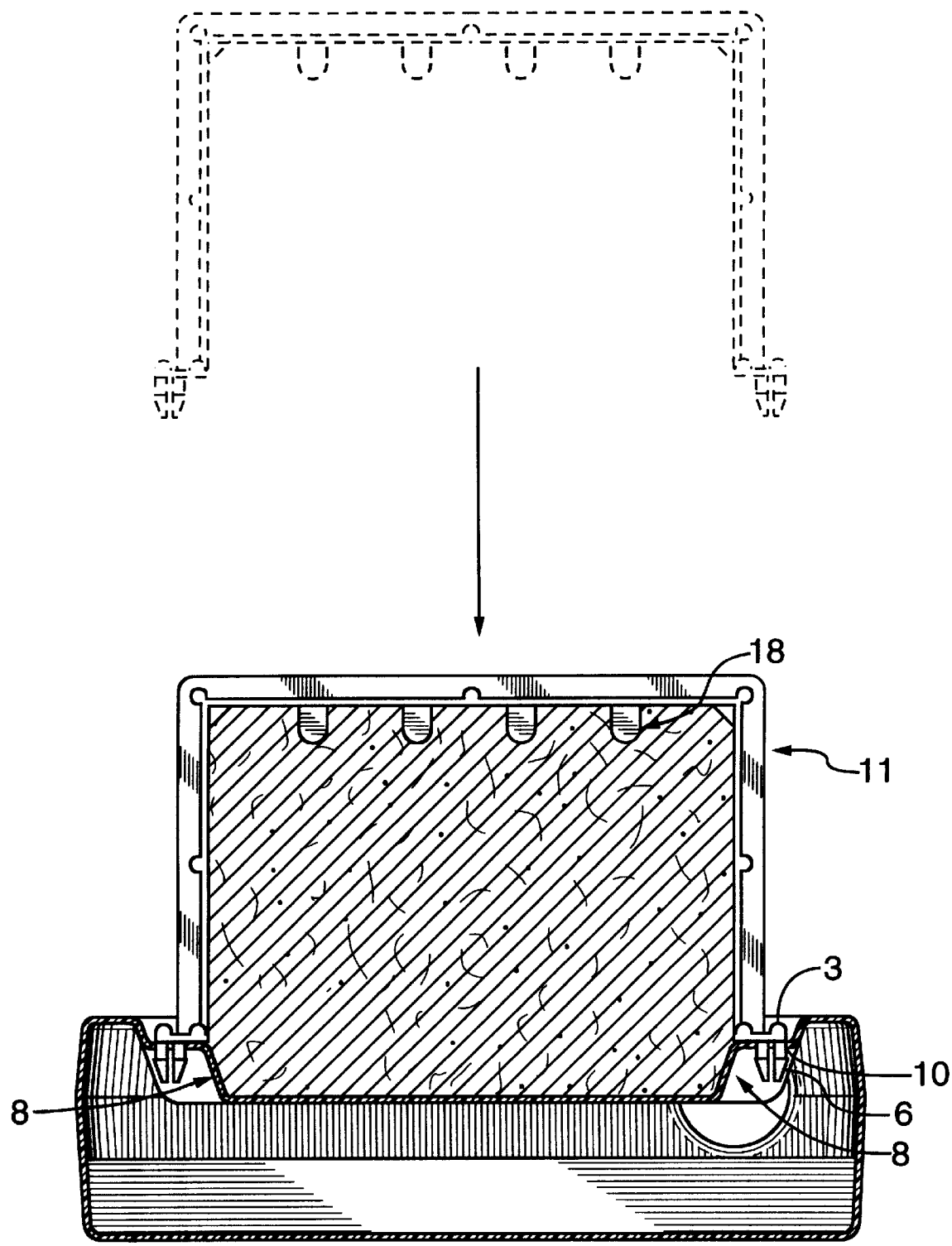
FIG. 7 is cross-sectional view 11—11 of FIG. 5 illustrating how the U-clips attach to the display holder.

Each side wall 5 of recess 2 has, in the preferred embodiment, two lateral half-cylindrical protrusions 8 extending from the recess floor 9 approximately half way up the side wall 5. Directly opposite to one set of protrusions 8 are another set of corresponding protrusions located on the opposing side wall 5. Each protrusion has clip receiving apertures 10. As shown in FIGS. 4 and 7, a pair of opposite facing protrusions 8 receive the ends of U-shaped clips 11 into apertures 10. The end of U-shaped clips 11 are locked into the protrusions by applying pressure onto thumb rests 3. As a result of the pressure the one-way inserts 6 snap into apertures 10. The head of insert 6 has a slightly larger diameter than the aperture 10 diameter while the diameter of the neck of insert 6 is slightly smaller than the aperture 10 diameter. This shape of insert 6 securely retains the foam 4 in the recess 2 despite a heavy load applied on the U-shaped clips 10. The U-shaped clips 10 also have teeth 18 disposed along the horizontal bar. The teeth assist in preventing the foam from shifting downwards.

Figure 6:
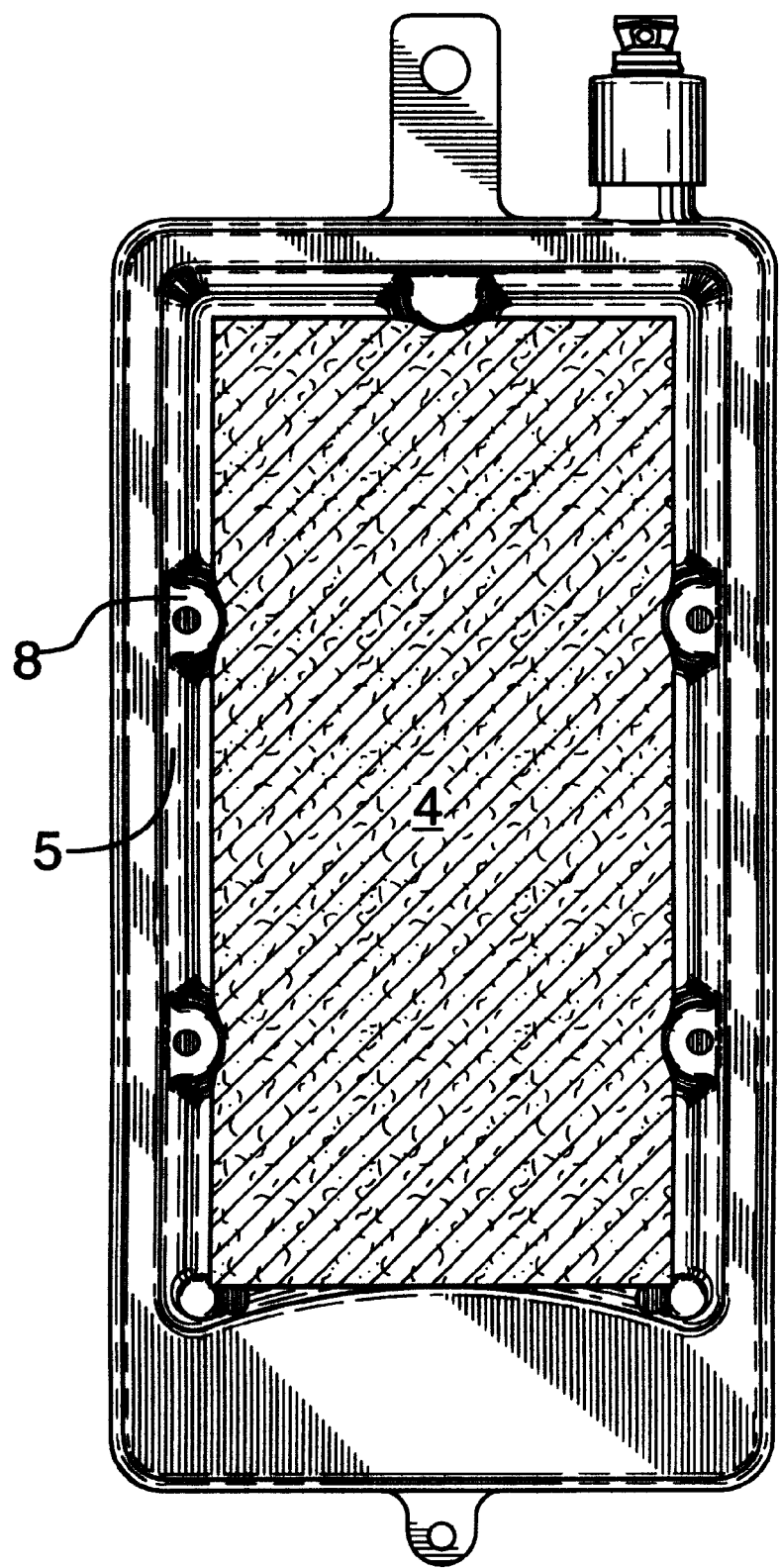
FIG. 6 is cross-sectional view 1—1 of FIG. 5.

In the preferred embodiment, the floral foam is of a size, as shown in FIGS. 4 and 6, to allow the outer side surfaces of the foam when inserted into the recess to be pinched by the protrusions 8, but so as not to come into contact with side walls 5. The foam is further pinched at the top by a top protrusion in the preferred embodiment. The pinching effect assists in securing the position of the foam 4 and provides for additional narrow pockets formed along the length of side recess wall 5 in the space between any two protrusions where some excess water from the foam may pool.

With reference to FIG. 2, the middle of lower recess wall 7, when viewed from the front, in the preferred embodiment, is at a higher elevation than at the corner junction with side recess wall 5 so as to produce a gradual downward sloping surface. This change in elevation advantageously allows the excess water that accumulates along the lower wall 7 to naturally flow to either of two drainage openings 14. Drainage openings 14, in the preferred embodiment, are located on the floor 9 adjacent to a slightly elevated cylinder-shaped protrusion 19 integrally located in the lower most corners of the recess 2. The drainage openings 14 allow excess water to drain into the water reservoir 15 (shown in FIG. 9).

Figure 9:
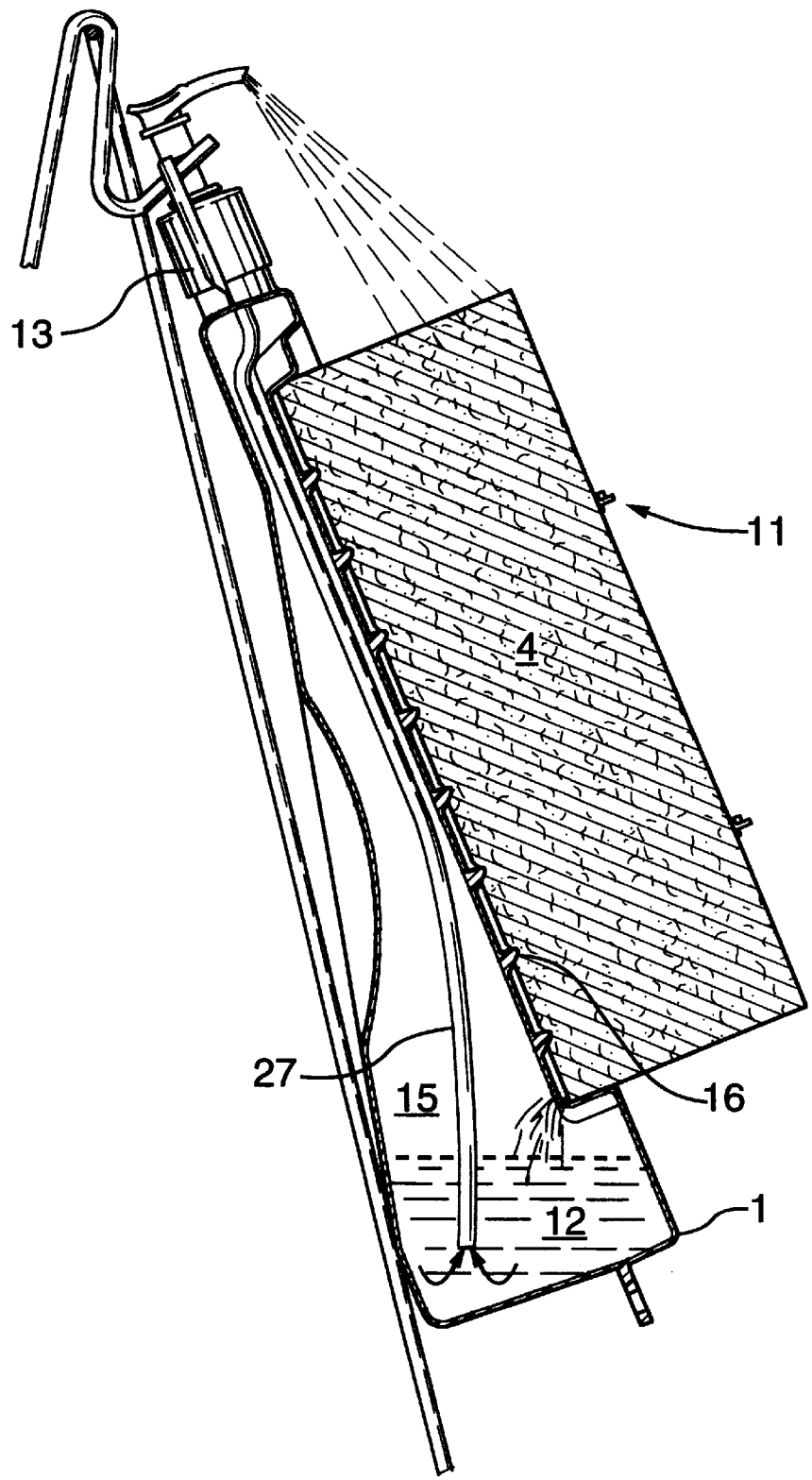
FIG. 9 is a cross-sectional view of the display holder resting on an easel illustrating the pump and reservoir.

Floor surface 9, when viewed from the front, as shown in FIG. 2, has a series of shallow U-shaped drip lips 16 extending therefrom. The shape of the drip lips has a number of advantages. First, the drip lips provide an area for water that seeped from the foam to pool in the general vicinity where the water exited the foam thereby allowing water to return to the area of the foam that will likely require water when the foam progressively dries. Another advantage is that the shallow U-shape of the drip lips 16 allow the drip lips 16 to anchor into the bottom surface of the foam, as shown in FIG. 9, when the foam is inserted into the recess 2. As a result, the foam does not significantly slide or shift downwards when the holder is in a displayed inclined position. In conjunction with the retaining clips 11, the drip lips securely hold the foam in its initial position in the recess 2. When the pooling area of any one lip cannot accommodate any further volume of water to pool, the excess water simply migrates down the inclined surface floor 9 towards the drainage openings 14.

With reference to FIG. 9, the reservoir 15 has a capacity to store, in the preferred embodiment, at least one cup of water 12. Initially, the reservoir 15 is filled with water for re-saturation purposes. Once a saturated foam is inserted into the recess 2 the reservoir 15 begins to collect excess water from drain openings 14. Water stored in the reservoir may be, advantageously, pumped out of the holder 1 through a tube 27 extending to the bottom of the reservoir 15. The other end of the tube 27 connects to a manual pump dispenser 13 screwed onto a threaded pump opening 17 (shown in FIG. 2) located on the top surface of housing 1. The water is either sprayed or simply flows, depending on the setting of the nozzle end, from the hand pump nozzle end onto the top portion of the foam to, advantageously, re-saturate the traditionally drier end of the foam 4.

Figure 3:
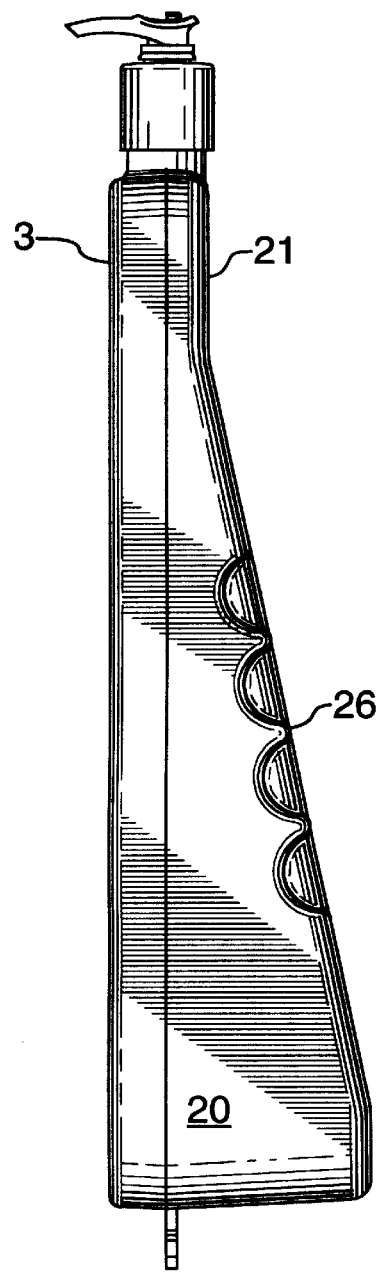
FIG. 3 is a side view of the display holder.
Figure 8:
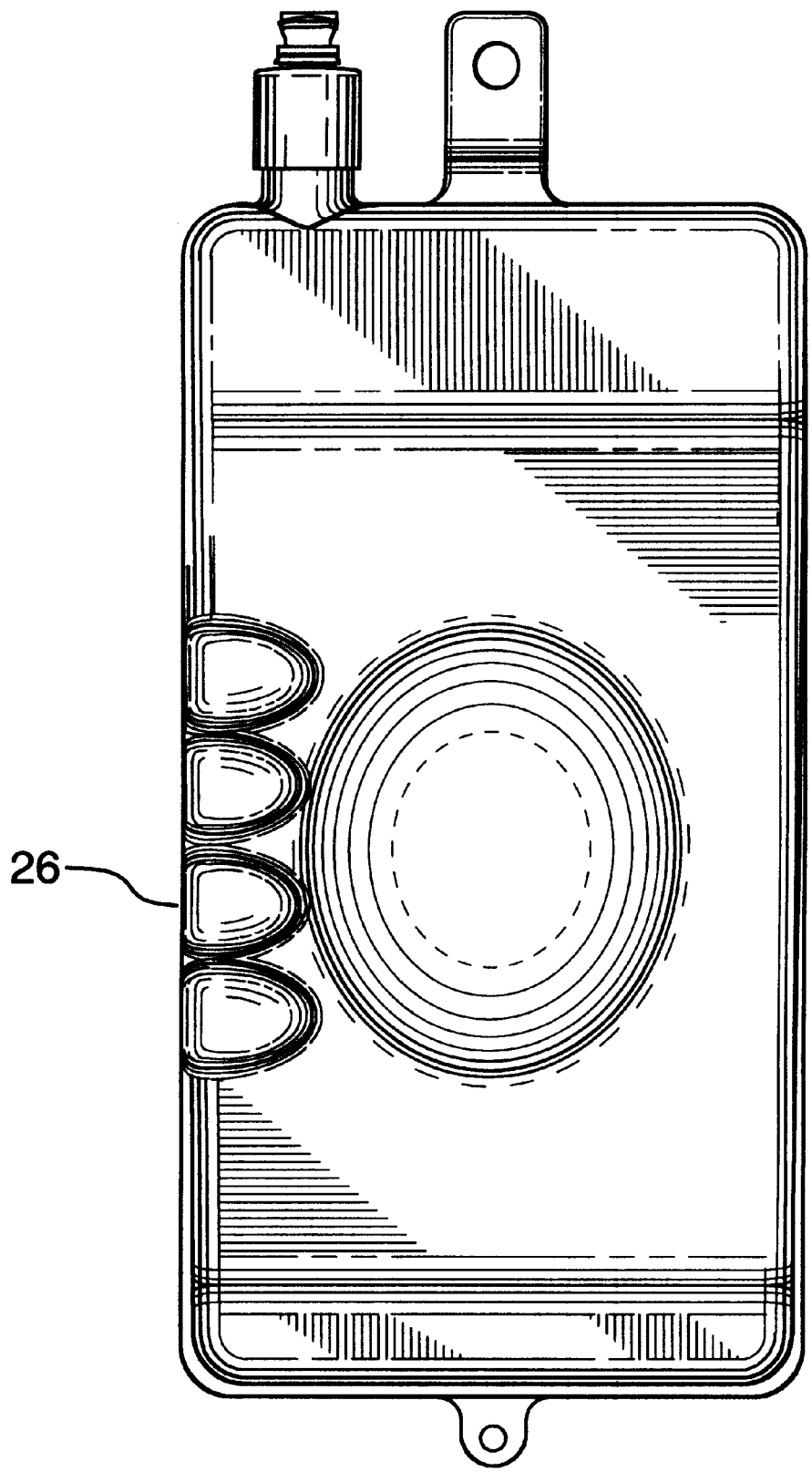
FIG. 8 is a rear view of the display holder.
Figure 10:
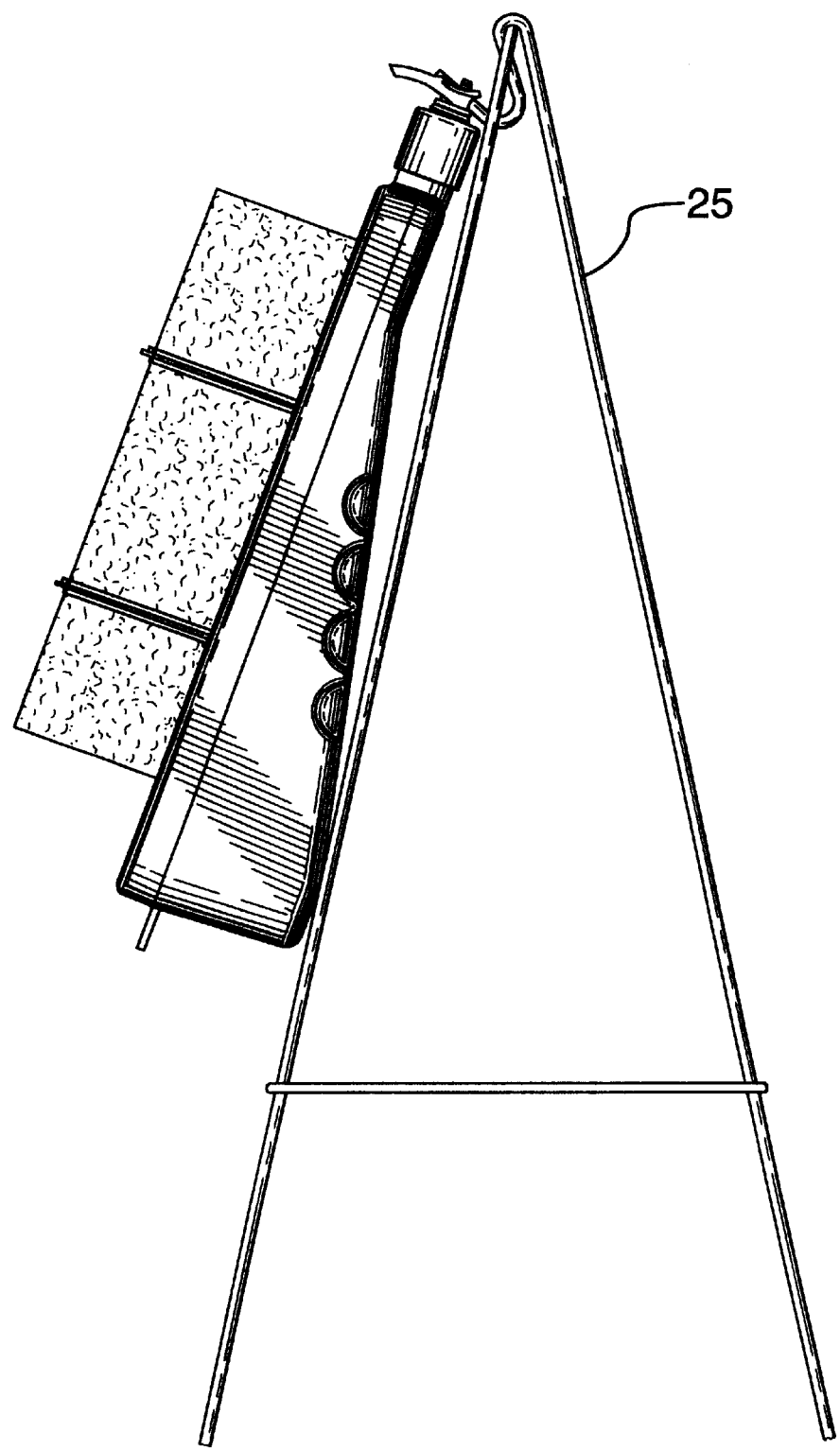
FIG. 10 is a side view of a display holder resting on an easel.

The profile view of the housing 1 is best shown in FIG. 3. The upper end of side walls 20 begins with a relatively narrow width having the plane of the rear surface 21 and the plane of front surface 3 substantially parallel to each other. The profile widens as the plane of the rear surface 21 tapers away from the plane of front surface 3. The resulting profile provides for a desirable preset inclined display for more favourable viewing of the flower arrangement when the display holder rests against, for instance, the legs of an easel 25 as shown in FIG. 10. The floral display holder may be conveniently carried by slipping a hand into handgrip 26. The handgrip 26, as shown in FIG. 8, consists of four finger rests integrally formed on the edge of the rear surface of the housing.

Figure 11:
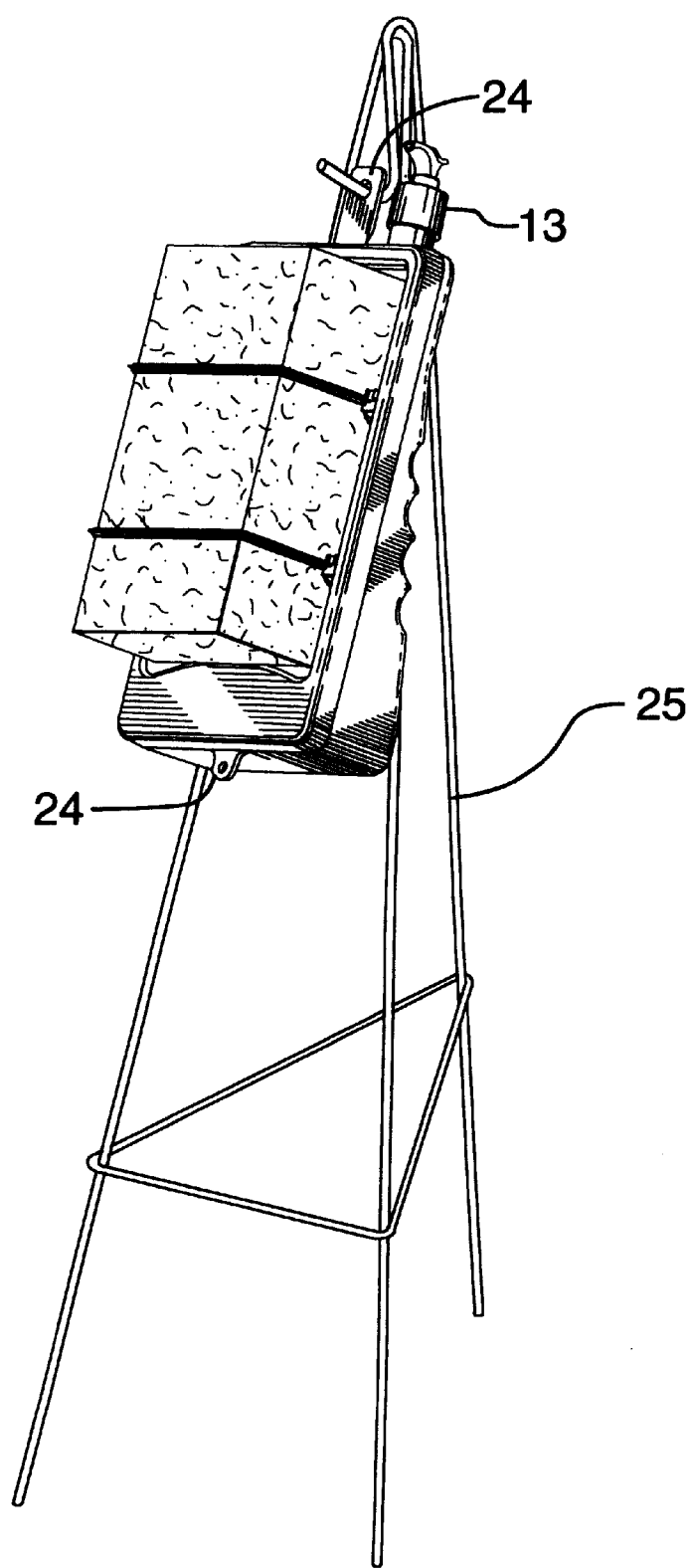
FIG. 11 is a perspective view of the display holder resting on an easel.

The holder may be hung vertically, or more commonly, rests securely on an incline, such as one provided by an display easel 25 (as shown in FIGS. 10 and 11). The holder is then attached at the top by inserting a commonly found hook in most easels through top tab opening 24. Should more stability be required, the holder may be further attached to the easel by lower tab opening 24 with wire or similar attaching means. When the floral foam requires additional water, the user simply pumps hand pump 13 and the pump draws the water from the reservoir and re-saturates the foam 4 by spraying water directly onto the upper portion of the foam. If the reservoir is depleted, additional water may be added into the reservoir by first unscrewing and removing the pump 13. The pump 13 is then reconnected and ready to dispense water again.

As a result of the unique housing shape, more foam exposure allows for better design capabilities such as easier insertion and angling of flowers and greens.

It will be appreciated that the above description relates to the preferred embodiment by way of example only. Many variations on the invention will be obvious to those knowledgeable in the field, and such obvious variations are within the scope of the invention as described and claimed, whether or not expressly described.

In another embodiment of the invention a new floral display arrangement may call for an alternative shape of the foam 4 such as an oval floral arrangement. In such a situation the holder 1 will be of another shape to accommodate the foam insert. Despite a change in the shape of the housing the scope of this invention will encompass such a change. Hence, the shape and proportions of the holder 1 may vary widely depending on what the needs of the particular application calls for.

Another variation of the preferred embodiment may have the dispenser pump located in another location besides the top surface of the holder 1. In addition, instead of only one pump on the holder 1 perhaps two pumps may be required in larger flower arrangements.

What is claimed as the invention is:

1. A floral display holder, comprising:

a hollow vertically-elongated housing, having a lower portion defining a liquid reservoir, a frontal recess in said housing, said recess having at least one drain hole at a lower area thereof to drain liquid from said recess into said reservoir, a bottom recess wall having a higher elevated middle portion than at its junction with adjacent side recess walls so as to form a generally sloped surface, and elevated protrusions having apertures, said protrusions pinching sides of a floral foam when installed in said recess;

means for securing the floral foam in said recess generally against a floor surface of said recess; and a manual pump attached to said housing, arranged so as to draw the liquid from said reservoir, and so as to outlet the liquid onto an upper portion of a said floral foam secured in said recess.

2. An invention as claimed in claim 1, wherein the means for securing a floral foam comprises:

at least one U-shaped clip, the horizontal arm of the clip having a set of floral foam gripping teeth, each free end of the U-shaped clip having a thumb rest, a neck extending from the thumb rest, and a fastening head extending from the neck, said head having a wider diameter than the neck; and at least two head and neck receiving apertures, each of said receiving apertures positioned near one of the side recess walls and having an opening slightly narrower than the head, but wider than the neck, thereby holding the floral foam securely in the recess while the holder is inclined in various positions.

3. An invention as claimed in claim 2, said housing further comprising hand gripping means to assist a user in transporting a completed floral arrangement.

4. An invention as claimed in claim 3, wherein the floor surface of the recess has a plurality of shallow U-shaped lips disposed outwardly therefrom, said lips allowing excess liquid from the floral foam to pool.

5. An invention as claimed in claim 4, wherein the hollow housing has a cross-sectional profile characterized by:

a side wall having a parallel front and rear surface forming a narrow upper portion of said side wall, the plane of the rear surface tapering away from the plane of the front surface so as to form a wide base for the housing.

* * * * *